United States Patent
Chen et al.

(10) Patent No.: US 6,785,899 B2
(45) Date of Patent: Aug. 31, 2004

(54) ADJUSTING DEVICE FOR AN OPTICAL DISK READING DEVICE

(75) Inventors: Han-Chao Chen, Taipei (TW); Jeng-Jiun Chen, Taipei (TW); Bor-Ruey Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 131 days.

(21) Appl. No.: 10/324,799

(22) Filed: Dec. 19, 2002

(65) Prior Publication Data

US 2003/0235142 A1 Dec. 25, 2003

(30) Foreign Application Priority Data

Jun. 25, 2002 (TW) ........................................ 91209575 U

(51) Int. Cl.$^7$ .............................................. G11B 17/30
(52) U.S. Cl. ...................................................... 720/675
(58) Field of Search .............................. 369/249, 215, 369/219, 220, 223, 244, 246, 247, 253

(56) References Cited

U.S. PATENT DOCUMENTS 5,995,479 A * 11/1999 Takizawa et al. ........... 369/219
6,005,836 A * 12/1999 Choi ........................... 369/219
6,014,362 A *  1/2000 Park ............................ 369/258
6,351,444 B1 *  2/2002 Sogawa et al. .............. 369/219
6,385,160 B1 *  5/2002 Jeon ............................ 369/219
6,704,270 B2 *  3/2004 Moriyama ................... 369/249

FOREIGN PATENT DOCUMENTS

JP          2000195063 A  *  7/2000  ............ G11B/7/08

* cited by examiner

Primary Examiner—George J. Letscher
Assistant Examiner—C R Magee
(74) Attorney, Agent, or Firm—Thomas, Kayden, Horstemeyer & Risley

(57) ABSTRACT

An optical disk adjusting assembly for an optical disk reading device. The optical disk adjusting assembly includes a chassis, a first guide rod, a second guide rod, an adjustable positioning element, a clamping plate, a disk rotating module and a disk reading module. The first guide rod and the second guide rod are respectively disposed on the chassis. The adjustable positioning element constrains two ends of the first guide rod and one end of the second guide rod. The clamping plate is secured to the chassis by screws and used to restrain a portion of the adjustable positioning element. Thus, the adjustable positioning element can constrain and adjust the two guide rods efficiently.

7 Claims, 5 Drawing Sheets

ADJUSTING DEVICE FOR AN OPTICAL DISK READING DEVICE

BACKGROUND OF THE INVENTION

1. Field of the Invention

The invention relates to an optical disk reading device, and more particularly to the optical disk reading device with an adjustable positioning element that can constrain and adjust guide rods efficiently.

2. Description of the Prior Art

Optical disk drives such as CD-ROM drives have been widely used in multimedia computer system, and more particularly for desktop computers. Most computer manufacturers regard the CD-ROM drives as the standard equipment shipped with their product. At present, the reading speed of optical disk drives have increased significantly with the development of optical data storage medium technology. However, the price of every optical disk drive is significantly lowered in recent years. Thus, for disk drives manufacturers, how to reduce the cost of assembly and key components is a challenge.

FIG. 1 shows an optical disk reading assembly 1a of a conventional optical disk reading device.

As shown in FIG. 1, the disk reading assembly 1a is embodied in the conventional CD-ROM drive. The disk reading assembly 1a is provided with a chassis 10a, a disk rotating module 20a, a disk reading module 30a, and two guide rods 40a. The disk reading module 30a is slidably mounted on two guide rods 40a. The two ends of each guide rod 40a must be respectively constrained by two holding pieces 50a fastened by screws 60a on the chassis 10a. If we would like to make sure the optical disk drive can read/write data accurately, then a tilt angle of the disk reading module 30a must be adjusted precisely. In this regard, the disk reading module 30a fails to do read/write operation accurately if the reading module 30a cannot receive the reflective laser beam from the optical disk because of an inaccurate tilt angle. Further, when an assembly worker adjusts the tilt angle of the disk reading module 30a, the assembly worker must fasten the two guide rods 40a by the four screws 60a beforehand. However, until the desirable tilt angle of the disk reading module 30a is determined, the two guide rods 40a are fixedly secured by the four screws 60a. If the assembly worker wants to adjust two guide rods 40a again, he must loose four screws and does the above procedure again. In prior art, the determination of tilt angle of the disk reading module 30a is tedious and time-consuming. Finally, the disk reading module 30a can slide along the guide rods 40a to read the data stored in the CD-ROM optical disk (not shown) that is placed on the disk rotating module 20a after the tilt angle is determined.

The optical disk reading assembly 1a of a conventional CD-ROM disk drive has the following disadvantages:

1. A plurality of holding pieces 50a are necessary to fasten the ends of two guide rods 40a, which results in increase of manufacturing cost, and
2. The additional holding pieces 50a require more assembly workers to assemble. Even worse, because the holding pieces 50a are thin and light, it is difficult and time-consuming for assembly workers to assemble the holding pieces 50a to the chassis 10a until the tilt angle is determined.

As mentioned, the disadvantages of the conventional optical disk unit must be overcome. Thus, there remains a need for an adjusting device that can constrain and adjust two guide rods with much less manufacturing cycle time and costs.

SUMMARY OF THE INVENTION

It is an object of the present invention to provide an optical reading with an adjusting device that can constrain and adjust guide rods efficiently.

It is another object of the present invention to provide a disk reading assembly with an adjusting device that can adjust the guide rods with three adjusting screws and resilience of the adjusting device. The present invention requires fewer components, thereby causing cost of manufacture to be decreased and complexity to be reduced.

According to the purposes of the present invention, a disk reading assembly has a chassis, a first guide rod, a second guide rod, an adjustable positioning element, a clamping plate, a disk rotating module and a disk reading module. Each end of the first guide rod and the second guide rod are respectively disposed on the chassis. One end of the second guide rod is fixedly secured to the chassis. The adjustable positioning element constrains two ends of the first guide rod and the other end of the second guide rod respectively. The clamping plate is used to restrain a portion of the adjustable positioning element on the chassis. Therefore, two guide rods can be mounted and adjustable on the chassis by the three adjusting screws and resilience of the adjustable positioning element.

DESCRIPTION OF THE DRAWINGS

For a better understanding of the present invention, reference is made to a detailed description to be read in conjunction with the accompanying drawings, in which.

DETAILED DESCRIPTION OF THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with the CD-ROM disk drive, the present invention can be applied to all optical disk drive, including but not limited to CD drives, DVD-ROM/DVD-RAM/DVD-RW drives and combo drives (DVD-ROM+CD-RW), etc.

Figure 1:
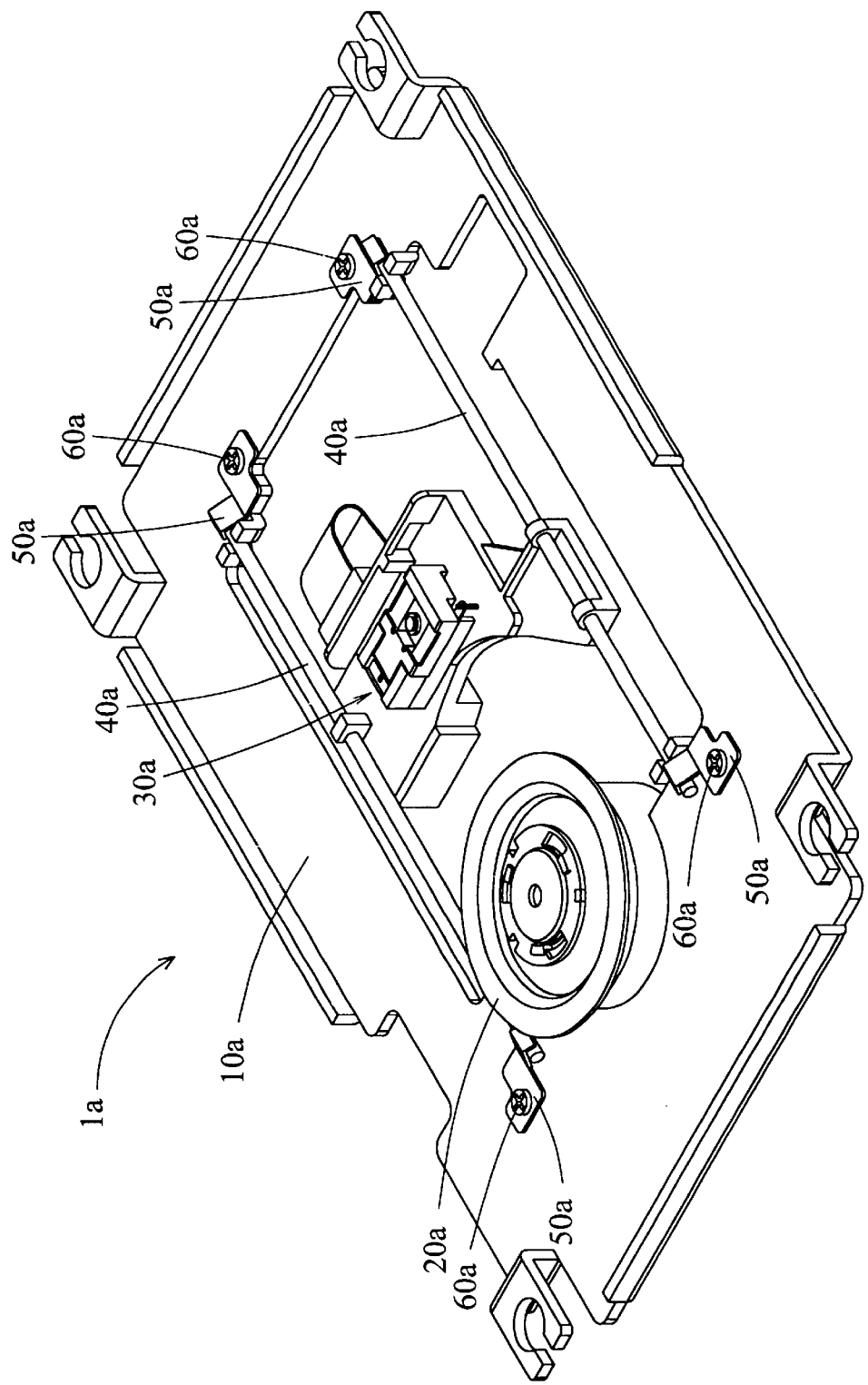
FIG. 1 is a perspective view of a conventional optical disk reading assembly.
Figure 2:
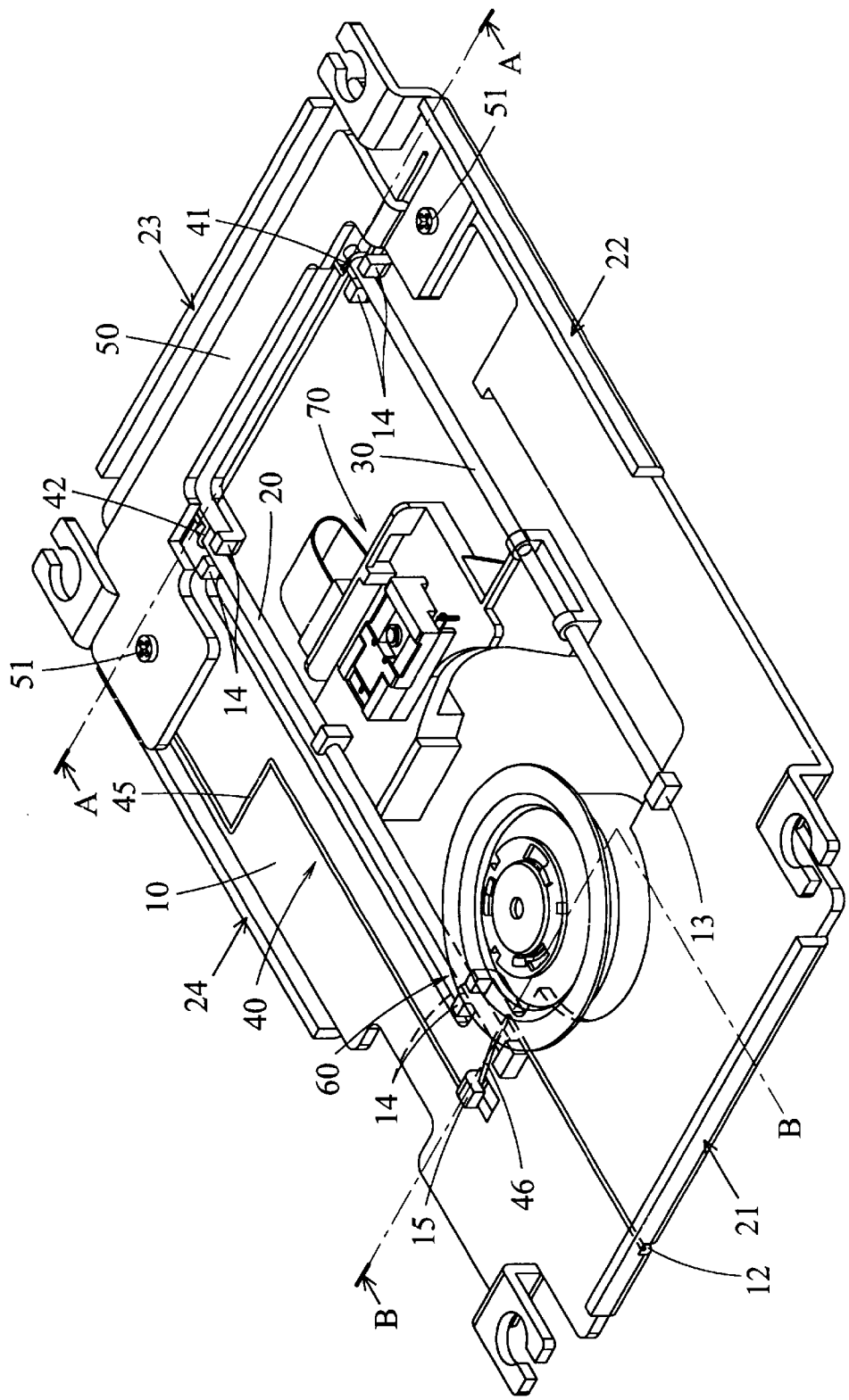
FIG. 2 is a perspective view of the optical disk reading assembly according to the present invention.
Figure 3:
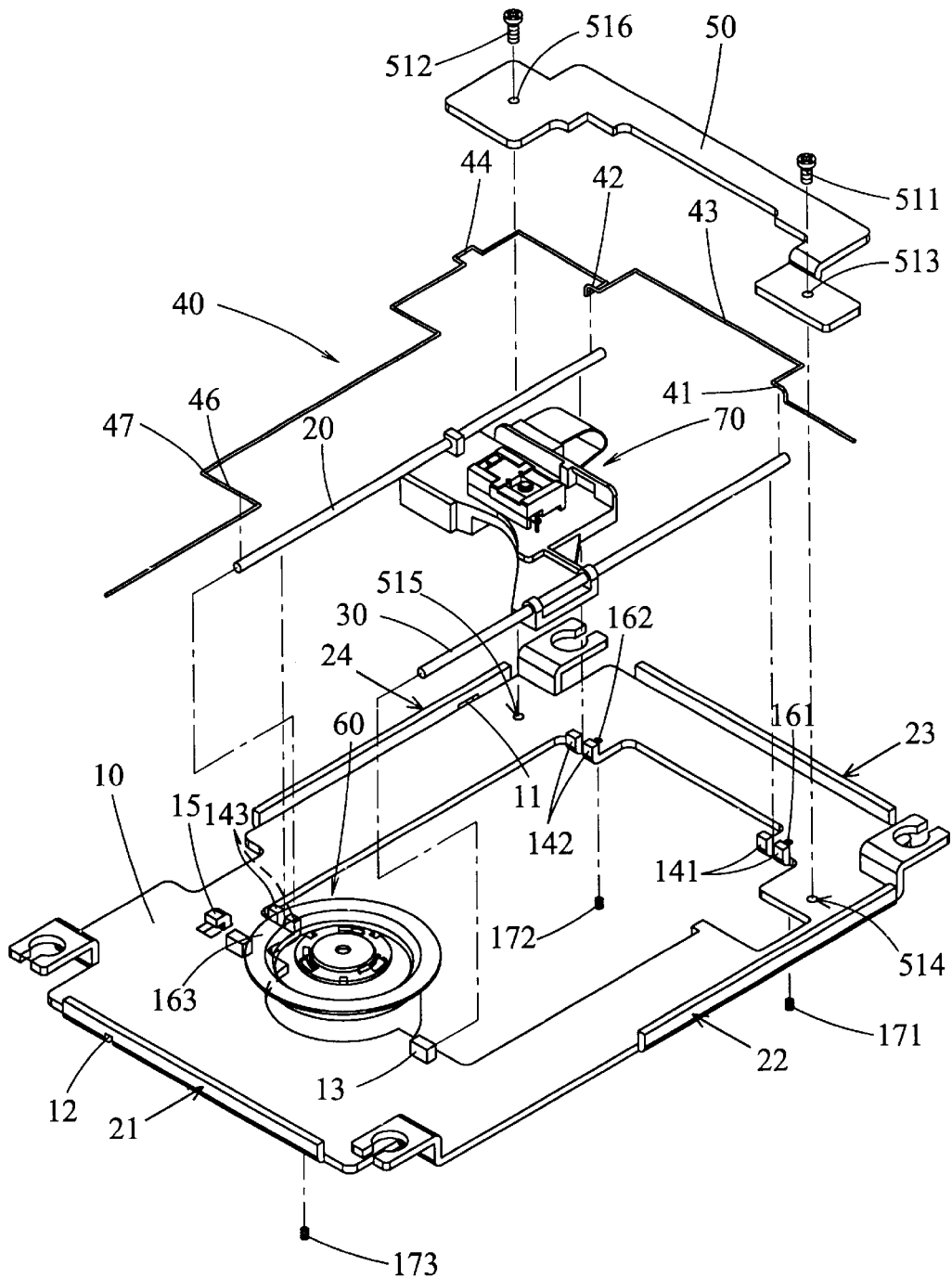
FIG. 3 is an exploded perspective view of the optical disk reading assembly according to the present invention.
Figure 4:
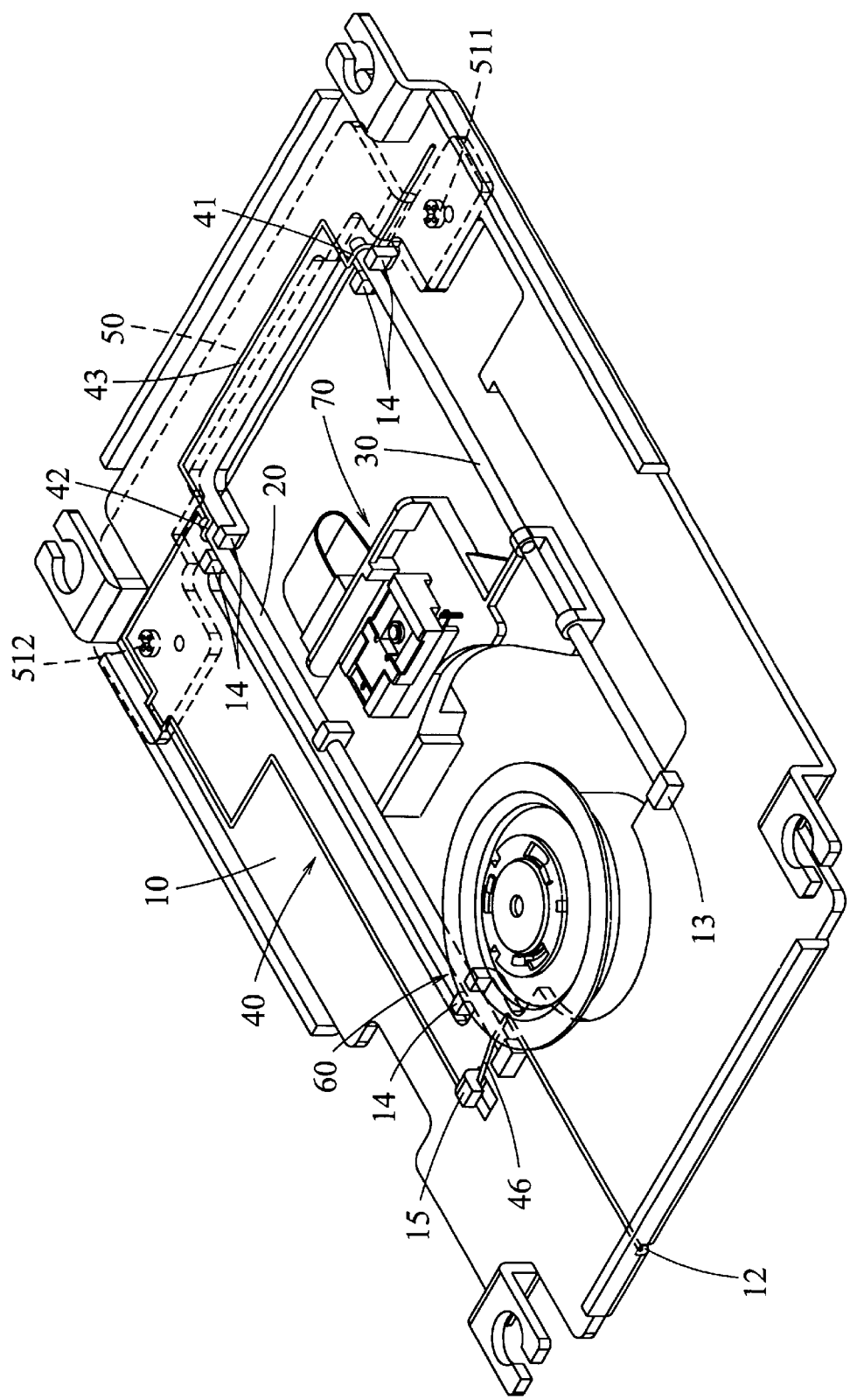
FIG. 4 is a perspective view of the optical disk reading assembly with a clamping plate in a phantom line according to the present invention.

FIGS. 2–4 illustrates an optical disk reading assembly 1 according to embodiment of the present invention. Also, FIG. 3 best illustrates the interconnections of the various components of the optical disk reading assembly 1.

Referring to FIGS. 2 and 3, the optical disk reading assembly 1 according to the present invention has a chassis 10, a first guide rod 20, a second guide rod 30, an adjustable positioning element 40, a clamping plate 50, a disk rotating module 60 and a disk reading module 70. The chassis 10 has a central hole 2, a front folded sidewall 21, a right folded sidewall 22, a rear folded sidewall 23 and a left folded sidewall 24. The chassis 10 also has a right support 141 positioned near the right sidewall 22, a left support 142 positioned near the left folded sidewall 24 and a front support 143 positioned adjacent the disk rotating module 60. In addition, the chassis 10 includes a fixing mount 13 positioned adjacent the disk rotating module 60 and a hook 15 positioned near the front support 143.

A hole 12 is defined in the front folded sidewall 21, and a groove 11 is defined in the left folded sidewall 24. Screw holes 161, 162 and 163 are provided on the chassis 10 and near the right support 141, the left support 142 and the front support 143 respectively. Further, screw holes 514 and 515 are also defined on the chassis and adjacent the right folded sidewall 22 and the left folded sidewall 24 respectively.

Referring to FIG. 3, the disk reading module 70 is slidably mounted on the first guide rod 20 and the second guide rod 30. One end of the second guide rod 30 is fitted in the fixing mount 13, and the right support 141 is adapted to receive the other end of the second guide rod 30. Similarly, the left support 142 and the front support 143 are adapted to receive both ends of the first guide rod 20.

The adjustable positioning element 40 is of metallic material and has a plurality of line segments. Alternatively, the adjustable positioning element 40 can consist of several plate segments. Further, the adjustable positioning element 40 includes a first constraining portion 41, a second constraining portion 42 and a third constraining portions 46.

In addition to the above, referring to FIG. 3, the clamping plate 50 is substantially shaped as an inverted "U", and two holes 513 and 516 are provided thereon.

To implement the adjustable positioning element 40 to the optical disk reading assembly 1, both ends of the adjustable positioning element 40 are fitted to the hole 12 of the front folded sidewall 21 and the groove 11 of the left folded sidewall 24, respectively. Then, the first constraining portion 41, the second constraining portion 42 and the third constraining portions 46 contact and constrain one end of the second guide rod 30 and two ends of the first guide rod 20 respectively. A right-angled segment 47 of the adjustable positioning element 40 is hooked to the hook 15, and the protruding portion 44 is fitted to the groove 11 of the left folded sidewall 24. In this regard, the adjustable positioning element 40 functions to secure the first guide rod 20 and the second guide rod 30 to the chassis 10 at the same time.

Referring to FIG. 3, two screws 511 and 512 extend through the holes 513 and 516 to threadly engage with the clamping plate 50 and the chassis 10. In this manner, the adjustable positioning element 40 can be fixed on the chassis 10 by the clamping plate 50, as shown in FIG. 4.

Figure 5:
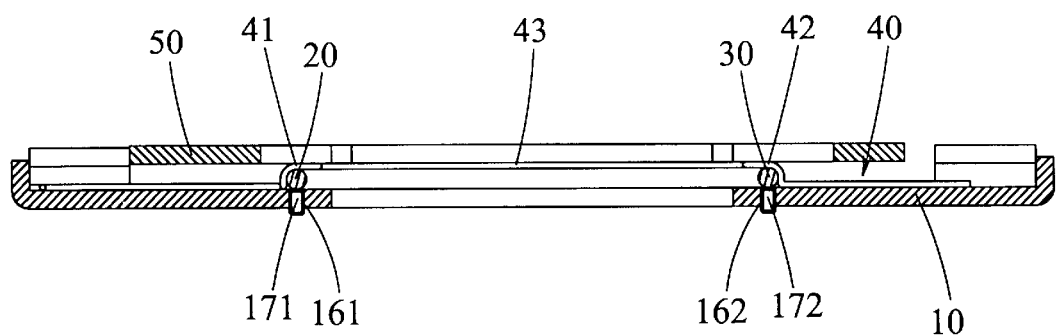
FIG. 5 is a cross-sectional view of the optical disk reading assembly taken along the line A—A of FIG. 2.
Figure 6:
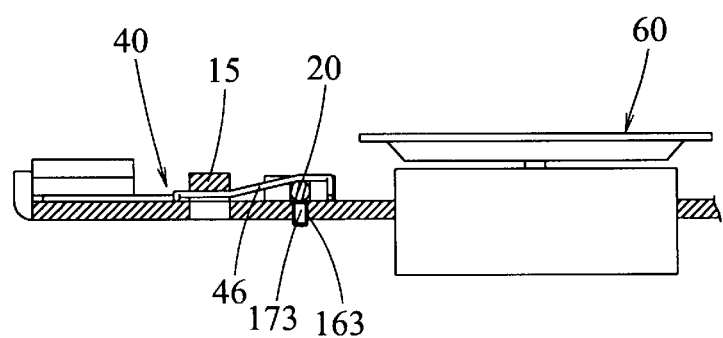
FIG. 6 is a cross-sectional view of the optical disk reading assembly taken along the line B—B of FIG. 2.

FIG. 5 illustrates the cross-sectional view taken along the line A—A and viewed from the rear folded sidewall 23. FIG. 6 illustrates the cross-sectional view taken along the line B—B and viewed from the front folded sidewall 21. When the assembly procedure of the adjustable positioning element 40 is complete, the tilt angle of the disk reading module 70 must be determined. Before the determination of tilt angle begins, the optical disk reading assembly 1 must be placed on a tilt measurement machine (not shown). As described above, the adjusting screws 171, 172 and 173 can be adjusted if necessary.

Referring to the FIGS. 3 and 5, the adjusting screws 171 and 172 thread through the screw holes 161 and 162 and are used to adjust the first guide rod 20 and the second guide rod 30. When either adjusting screw 171 or 172 further is threaded into the screw holes 161 or 162, the optical plane defined by the first guide rod 20 and the second guide rod 30 is changed.

Similarly, referring to FIGS. 3 and 6, the adjusting screw 173 threads through the screw hole 163 and is used to adjust the first guide rod 20 and the second guide rod 30. When the adjusting screw 173 further is threaded into the screw hole 163, the optical plane defined by the first guide rod 20 and the second guide rod 30 is changed. Once the tilt angle of the disk reading module 70 is determined, the assembly procedure of the optical disk reading assembly 1 is complete.

The advantage of the present invention is that the adjustable positioning element 40 constrains the first guide rod 20 and the second guide rod 30. By adjusting three adjusting screws 171, 172 and 173, the tilt angle of the disk reading module 70 can be easily determined. Therefore, the disk reading assembly with the adjustable positioning element that can adjust and constrain the guide rods with three adjusting screws and resilience of the adjusting device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjusting device for an optical disk reading device, comprising:

a chassis having a plurality of supports and holes;

a first guide rod and a second rod, each rod having two ends disposed on two supports;

a disk reading module, being sildably mounted on the first guide rod and the second guide rod;

an adjustable positioning element, being fitted to the holes of the chassis and constraining the two ends of the first guide rod and the one end of the second guide rod;

a disk rotating module, fixed to the chassis and used to rotating optical disk; and a clamping plate, being fixed to the chassis and constraining a portion of the adjustable positioning element.

2. The adjusting device as claimed in claim 1, wherein the adjustable positioning element further includes a plurality of constraining portions to restrict one end of the first guide rod and one end of the second guide rod.

3. The adjusting device as claimed in claim 1, wherein the chassis further has a hook and a hole, and a portion of the adjustable positioning element is hooked to the hook.

4. The adjusting device as claimed in claim 1, wherein one end of the adjustable positioning element is fixed by the clamping plate.

5. The adjusting device as claimed in claim 1, wherein the adjustable positioning element includes line segment or plate-shaped segments.

6. The adjusting device as claimed in claim 1, wherein the adjustable positioning element is of elastic material.

7. An adjusting device for an optical disk reading device, comprising:

a chassis having a plurality of supports and screw holes;

three folded sidewalls, a hole provided in each sidewall;

a first guide rod and a second rod, each rod having two ends disposed on two supports and being adjusted by adjusting screws;

a disk reading module, being sildably mounted on the first guide rod and the second guide rod;

an adjustable positioning element, one end being fitted to the hole of the chassis and constraining the two ends of the first guide rod and the one end of the second guide rod;

a disk rotating module, fixed to the chassis and used to rotating optical disk; and a clamping plate, having screw holes and being fixed to the chassis by screws and constraining a portion of the adjustable positioning element.

\* \* \* \* \*